United States Patent
Bondar

(10) Patent No.: US 10,313,209 B2
(45) Date of Patent: Jun. 4, 2019

(54) SYSTEM AND METHOD TO SAMPLE A LARGE DATA SET OF NETWORK TRAFFIC RECORDS

(71) Applicant: Arbor Networks, Inc., Burlington, MA (US)

(72) Inventor: Ivan Bondar, Sydney (AU)

(73) Assignee: Arbor Networks, Inc., Burlington, MA (US)

( * ) Notice: Subject to any disclaimer, the term of this patent is extended or adjusted under 35 U.S.C. 154(b) by 356 days.

(21) Appl. No.: 15/395,562

(22) Filed: Dec. 30, 2016

(65) Prior Publication Data
US 2018/0191584 A1    Jul. 5, 2018

(51) Int. Cl.
*H04L 12/26* (2006.01)

(52) U.S. Cl.
CPC .......... *H04L 43/024* (2013.01); *H04L 43/026* (2013.01)

(58) Field of Classification Search
CPC ... H04L 65/60; H04L 29/06027; H04L 47/30; H04L 67/10; H04L 47/10; H04L 47/20; H04L 65/605; H04L 67/26; H04L 43/024; H04L 47/11; H04L 47/215; H04L 65/80; H04L 69/22; H04L 43/062; H04L 43/16; H04L 45/127; H04L 47/115; H04L 47/31; H04L 47/32; H04L 47/323; H04L 49/90; H04L 63/1416; H04L 12/5601; H04L 2012/5637; H04L 2012/5651; H04L 41/147; H04L 43/02; H04L 43/0876; H04L 47/2441; H04L 47/245; H04L 47/283; H04L 47/29; H04L 63/1425;

(Continued)

(56) References Cited

U.S. PATENT DOCUMENTS

| 2003/0120769 A1* | 6/2003 | McCollom | H04L 45/00 709/224 |
| 2008/0291915 A1* | 11/2008 | Foschiano | H04L 43/026 370/392 |
| 2012/0117254 A1* | 5/2012 | Ehrlich | H04L 41/142 709/228 |

OTHER PUBLICATIONS

Yang, Lili, "Sample Based Estimation of Network Traffic Flow Characteristics", A dissertation submitted in partial fulfillment of the requirements for the degree of Doctor of Philosophy (Statistics) in The University of Michigan, 2009; https://deepblue.lib.umich.edu/bitstream/handle/2027.42/62382/yanglili_1.pdf?sequence=1&isAllowed=y.

* cited by examiner

*Primary Examiner* — Chris Parry
*Assistant Examiner* — Abderrahmen Chouat
(74) *Attorney, Agent, or Firm* — Locke Lord LLP; Scott D. Wofsy; Christopher J. Capelli

(57) ABSTRACT

A computer-implemented method to sample a large data set of traffic records, including receiving a traffic record associated with a traffic flow from a source of a large data set of traffic records, incrementing a flow counter representing a number of traffic flows received for one address of a pair of addresses identified by a traffic record, adding a traffic size of the traffic flow associated with the received traffic record to a total traffic size of all flows received in previous iterations. If the flow counter is less than a predetermined sampling threshold, then storing a traffic record sample associated with the traffic record. If the flow counter is more than the predetermined sampling threshold, then determining whether or not to sample the received traffic record by applying an exponentially decreasing probability function. Storing the traffic record sample as sampled data associated with the traffic record only if the determination is to sample the received traffic record.

20 Claims, 5 Drawing Sheets

(58) Field of Classification Search
CPC ............... H04L 63/145; H04L 65/4084; H04L 12/5602; H04L 2012/5636; H04L 43/045; H04L 43/065; H04L 43/0882; H04L 43/18; H04L 45/302; H04L 45/304; H04L 47/12; H04L 47/13; H04L 47/2408; H04L 47/2416; H04L 47/26; H04L 47/36; H04L 49/108; H04L 49/309; H04L 12/413; H04L 12/4625; H04L 2012/5638; H04L 2012/5647; H04L 2012/5681; H04L 2012/5682; H04L 2012/5687; H04L 29/12009; H04L 41/0213; H04L 41/0681; H04L 41/069; H04L 41/5009; H04L 41/5019; H04L 41/5022; H04L 41/5038; H04L 43/026; H04L 43/08; H04L 43/0852; H04L 43/10; H04L 43/106; H04L 47/16; H04L 47/17; H04L 47/225; H04L 47/24; H04L 47/2425; H04L 47/25; H04L 47/263; H04L 47/27; H04L 47/286; H04L 47/39; H04L 47/50; H04L 47/6215; H04L 47/6225; H04L 49/30; H04L 49/351; H04L 49/50; H04L 61/00; H04L 63/1458; H04L 65/604; H04L 67/2842; H04L 69/12; H04L 69/16; G06F 16/24568; G06F 11/00; G06F 11/1402; G06F 16/248; G06F 16/252; G06F 16/258; G06F 16/951; G06F 9/541; G06F 21/56; G06F 13/161; G06F 17/141; G06F 17/5009; G06F 2217/74; G06F 11/076; G06F 13/385; G06F 19/00; G06F 19/30; G06F 21/6245; H04W 40/005; H04W 40/10; H04W 40/22; H04W 40/248; H04W 48/12; H04W 56/00; H04W 84/18; H04W 8/005; H04W 4/70; H04W 84/047
See application file for complete search history.

SYSTEM AND METHOD TO SAMPLE A LARGE DATA SET OF NETWORK TRAFFIC RECORDS

FIELD OF THE INVENTION

The present technology relates to methods and systems for sampling a large data set of network traffic records, and, more particularly, methods and systems for compensating for skewing by applying a probability function when sampling the data.

BACKGROUND OF THE INVENTION

Statistical information can be culled from large data sets. However, it can be impracticable or impossible to store the large data set, and similarly impracticable or impossible to perform a statistical analysis on the large data set.

Conventional methods and systems sample data in a large data set in order to analyze the large data set. However, such conventional methods and systems do not compensate for a common problem of skewed traffic distribution in which address associated with a small number of particular addresses accounts for a large portion of the total traffic associated with a large number of addresses. Without accounting for the skewing problem, sampling traffic from the addresses that are associated with disproportionately large amounts of traffic can introduce errors, in addition to being inefficient and overly time consuming.

Such conventional methods and systems have generally been considered satisfactory for their intended purpose. However, there is still a need in the art to compensate for skewed network traffic in an efficient manner that preserves accuracy. The present disclosure provides a solution for these problems.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings.

To achieve these and other advantages and in accordance with the purpose of the illustrated embodiments, in one aspect, disclosed is a computer-implemented method to sample a large data set of traffic records, the traffic records corresponding to network traffic flows associated with at least one particular address. In another aspect, a system is provided that includes a memory configured to store instructions and a processor disposed in communication with the memory, wherein the processor upon execution of the instructions is configured to perform the method.

The method includes processing multiple iterations associated with respective traffic records of the large data set that satisfy particular criteria. Processing an iteration of the multiple iterations includes receiving a traffic record from a source of a large data set of traffic records, the traffic record corresponding to a traffic flow and identifying a pair of addresses exchanging communications included in the traffic flow and including a traffic size value that indicates the size of communications included in the traffic flow and receiving a flow counter and a total traffic size, the flow counter representing the number of traffic flows received for one of the addresses of the pair identified, the number of traffic flows representing previously received traffic records associated with the address, the total traffic size representing a sum of traffic sizes associated with all previously received traffic records, the previously received traffic records having been received during previous iterations of the multiple iterations.

The method further includes incrementing the flow counter, and adding the traffic size associated with the received traffic record to the total traffic size. If the flow counter is less than a predetermined sampling threshold, then the method includes storing a traffic record sample associated with the traffic record. If the flow counter is more than the predetermined sampling threshold, then the method includes determining whether or not to sample the received traffic record by applying an exponentially decreasing probability function, and storing the traffic record sample as sampled data associated with the traffic record only if the determination is to sample the received traffic record.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
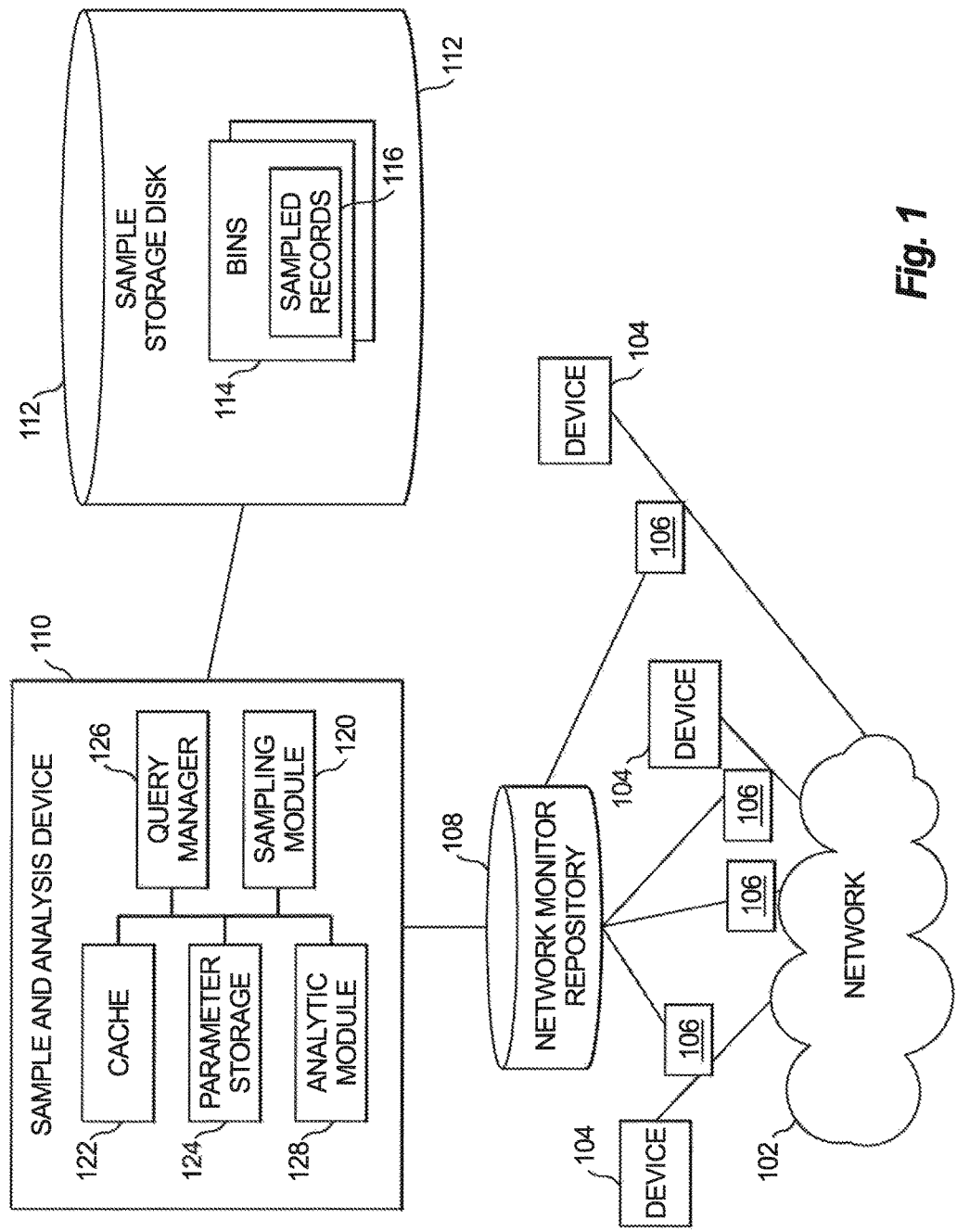
FIG. 1 illustrates a block diagram of an example network system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a network system in accordance with the disclosure is shown in FIG. 1 and is designated generally by reference character 100. Other embodiments of the network system 100 in accordance with the disclosure, or aspects thereof, are provided in FIGS. 2-5, as will be described. The systems and methods described herein can be used to provide improved processing of large data sets that may have skewed data, for example in network communication applications, without limitation to a data network context. The term "large data set" is defined as a large data set that may be dynamic in response to a property, such as time, space, types of data sensed, or characteristics of data sensed, for example data sets related to data networks, transportation, biological sensing, weather sensing, geologic sensing, etc.

A system and method to sample and store data associated with a large data set that may be skewed, and to enable queries for statistical information about the large data set for a requested time interval is shown and described with respect to FIGS. 1-5. FIGS. 1-5 relate to network traffic flowing through network system 100. However, system 100 and related methods can be applied to other contexts, such as wherein the large data set is generated by a different source, such as a network of sensors or computing devices, e.g., in a communication, transportation, biological, weather, geologic, or astrologic context.

In the context shown and described with respect to FIGS. 1-5 a query can request performance of a statistical analysis for a requested time interval. In other contexts, the requested interval can be for a different type of interval, and a query can be associated with another property instead of time, for example, the source of the data, the entity being measured, or the type of measurement data. The requested interval (e.g., time interval) can be selected by a user or a processing device.

The statistical analysis can be, for example, determination of most and/or least frequently occurring elements (also referred to as top-k) in the large data set; determination of an average, mean, maximum, and/or minimum value of a property or characteristic related to the data in the large data set; and/or count, sum, mode, or quantiles of elements in the data set.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, network system 100 includes a computer network 102. Devices 104 are coupled to the network 102 and can communicate with other devices 104 that are coupled to the network 102 or included in the network 102, such as for delivery of large amounts of data, e.g., communication data or streamed media, from one device 104 to another device 104. The network 102 can be, for example, a network such as the Internet, a private network, a different public network, a cellular network, a personal communication service (PCS) network, a public switched telephone network (PSTN), a wireless network, a wireless network, etc.

The devices 104 can be included in the network 104 or communicate with the network 104 and one another via one or more communication links. These communication links can be wireless, wired, or a combination thereof. The devices 104 can be, for example, mobile computing devices, smart phones, servers, media servers, stationary computing devices, sensors, network devices, etc. In an example scenario, the devices 104 include a plurality of mobile or stationary computing devices operated by subscribers that subscribe to one or more media services, where in the media services can be provided by one or more media servers. Large amounts of data are exchanged between the one or more media servers and the computing devices or between the computing devices.

Monitoring devices 106 monitor network traffic flows, each flow corresponding to a conversation between devices 104 over the network 102. The monitoring devices 106 can include hardware, firmware, and/or software components that are configured to monitor network traffic, wherein monitoring can include, for example, measuring, intercepting, capturing, copying, or inspecting a network traffic packet, flow, or stream. Monitor devices 106 can include central or distributed elements for performing tasks associated with the monitoring. The monitor devices 106 can be passive or active and include, for example distributed or centralized network devices, such as routers, switches, collection devices, taps and probes, that acquire and/or collect flow summaries. In embodiments, the monitor devices 106 can include distributed or centralized capture devices, such as taps, probes, or port mirrors that acquire or collect data packets, summaries about the data packets, or summaries about data flows. These elements can be positioned inline, and/or remote relative to devices 104 and communication links used by the devices 104 and network 102.

The monitor devices 106 output data based on the measuring, intercepting, capturing, copying, and/or inspecting performed. The output data is provided as traffic records to a network monitor repository 108. Collection devices included with the monitor devices 106 can collect traffic records they output or that were output by other monitor devices 106 and provide the data to the network monitor repository at intervals or in response to an event.

The network monitor repository 108 receives and stores traffic records collected by the monitoring devices 106 and/or collection devices. The traffic records each have an associated time stamp that indicates an event time, such as a time of transmission by a source, a time that the associated traffic flow was monitored by the monitoring devices 106, or a time that the traffic record was first stored by the network monitor repository 108.

In addition, each traffic record identifies an IP address of source and/or target destination devices 104 that are communicating with one another in a particular conversation included in the corresponding traffic flow. Additional fields associated with each traffic record can include one or more of incoming traffic size, outgoing traffic size, destination port, source port, and protocol (e.g., TCP, UDP, etc.). The traffic records stored by the network monitor repository 108 can be stored as sequential data, the sequence being based on the time stamps associated with the traffic records.

The data stored by the network monitor repository 108 can be a large data set. For example, the large data set can be so large that it would be extremely cumbersome, time consuming, or inefficient to perform statistical analysis on the large data set. Additionally, the data stored by the network monitor repository 108 can be skewed. The skewed condition can occur, for example, when a large percentage of the traffic data is associated with a small percentage of addresses (e.g., target destination or source addresses).

The network monitor repository 108 includes at least one disk for storing the large data set. The network monitor repository 108 can include data structures, such as a database, for storing the large data set in an organized fashion.

A sample and analysis device 110 samples traffic records of the large data set stored by the network monitor repository 108. The sample and analysis device 110 further processes stored sample records, such as in response to a submitted query, by applying a statistical analysis. The sample and analysis device 110 includes a sampling module 120, a cache 122, parameter storage 124, a query manager 126, and an analytic module 128.

The query manager 126 includes a user interface to receive queries that request performance of a statistical analysis on data of the data set that correspond to a requested time interval. The query manager 126 also handles queries (e.g., requests) from processing devices or modules. A query can request statistical analysis periodically or in response to an event. The query can specify a time interval, and in addition can specify one or more addresses of interest.

In embodiments, the query manager 126 can include one or more interfaces that communicate with a user input device (e.g., a touchscreen, keyboard, cursor control device (e.g., mouse), etc.) and/or a user output device (e.g., display screen (e.g., the touchscreen), printer). The one or more interfaces can include a GUI that a user can operate for entering queries. In embodiments, the query manager 126 receives queries from another processing device or software module. The query manager 126 can provide statistical results output by the analytic module 128 to the user output device or to the requesting processing device.

The sampling module 120 can respond to the queries by discovering traffic flows that have associated time stamps which are included in the requested time interval. The sampling module 120 can further decide whether to sample traffic records associated with the discovered traffic flows, and sample the traffic records based on application of a probabilistic function. The probabilistic algorithm compensates for potential skewing of the large data set. In embodiments, the probabilistic algorithm includes applying an exponentially decreasing probability of sampling the received traffic records. The sampling module 120 further stores the traffic records in bins 114 of a sample storage disk 112 if they are not being sampled.

The sampling module 120 interacts with the parameter storage to access and update various parameters used by the sampling algorithm, including a traffic size value, a total flow counter, a total traffic size, threshold values, a probability factor, a sample flow counter, a sampling rate, scaled average flow size, and an amount of flow counters. Each sample flow counter can correspond to a particular pair of addresses (e.g., IP addresses) associated with devices 104, wherein a sample flow counter associated with a particular pair is established and incremented for each network flow discovered in the large data set between that pair. A flow counter can be established for each unique address pair for which network flows have been discovered. The amount of flow counters can indicate the number of discovered unique address pairs for which different flow counters have been established.

The sampling module 120 determines whether to store the sampled traffic records in the sample storage disk 112 (e.g., in bins 114) or in a cache 122 for temporary storage. Additionally, the sampling module 120 determines, when emptying the cache 122, which of the sampled traffic records emptied from the cache 122 to store in bins 114, and which to discard.

The analytic module 128 performs the statistical analysis using sampled data 116 stored in bins 114 of the sample storage disk 112. The query manager 126 further interacts with a user display device to display a result of the statistical analysis to a user, such as via graphical user interface (GUI).

With reference to sample storage disk 112, sampled traffic records that are selected for long term storage are stored as sampled data 116 in bins 114, using one or more appropriate bins 114. The bins 114 can be arranged hierarchically, e.g., in a nested configuration and corresponding to time intervals of different lengths, with each bin corresponding to a different time interval. Thus each bin 114 has a unique combination of start time (relative to the reference time) and duration that corresponds to its unique time interval. Within the hierarchy, the duration of large bins 114 can be exact multiples of the duration of small bins 114. In this fashion, the bins 114 can be nested. The bin(s) 114 that the sampled data are stored in are selected based on the time stamp associated with the sampled data and the respective time intervals associated with the bins.

For example, bins 114 can include multiple series of bins 114, wherein the bins 114 in each series have the same duration and correspond to consecutive intervals. In an example, intervals corresponding to large bins of a first bin series have a long duration, and intervals corresponding to small bins of a second bin series have a relatively short duration, the small bins being nested within the large bins, forming two hierarchical levels. In this example, two hierarchical levels are described, however in embodiments a single level or multiple hierarchical levels, without limitation, can be used.

The first and second series can be aligned with one another. For example, the small bins can have a duration of five minutes. The large bins can have a duration of one day. The beginning of the 289th small bin can be aligned with the second large bin. When the sampling module 120 decides to store a sampled traffic record to the sample storage disk 112 as sampled data, the sampled traffic record is added to each of the bins 114 (e.g., a large bin and a small bin) that correspond to a time interval that includes the time stamp associated with the sample traffic record.

Two or more of the modules 118-128 of the sample and analysis device 110 can be integrated in a single device, be configured as discrete devices, and/or share one or more hardware and/or software components. Additionally, the sample and analysis device 110 and its respective modules 118-128 can be implemented as physical or virtual devices. Whether implemented as a physical or virtual device, the sample and analysis device 110 and any of its respective modules 118-128 uses a hardware processing device that executes software instructions, which enables performance of the disclosed functions.

The sample and analysis device 110 includes a central processing unit (CPU), random access memory (RAM), and a storage medium, which can be connected through buses and used to further support the processing of the received packets. Programmable instructions can be stored in the storage medium and executed by the CPU to cause the CPU to perform operations described herein. The storage medium can also include the parameter storage 124.

In embodiments, at least portions of the network monitor repository 108 and/or the sample and analysis device 110 are external to the network 102. In embodiments, at least portions of the network monitor repository 108 and/or the sample and analysis device 110 are located internal to network 102. At least portions of the network monitor repository 108 and/or the sample and analysis device 110 can be located at a network edge (inside or outside of the network 102) and/or deeper within the network 102.

Figure 2:
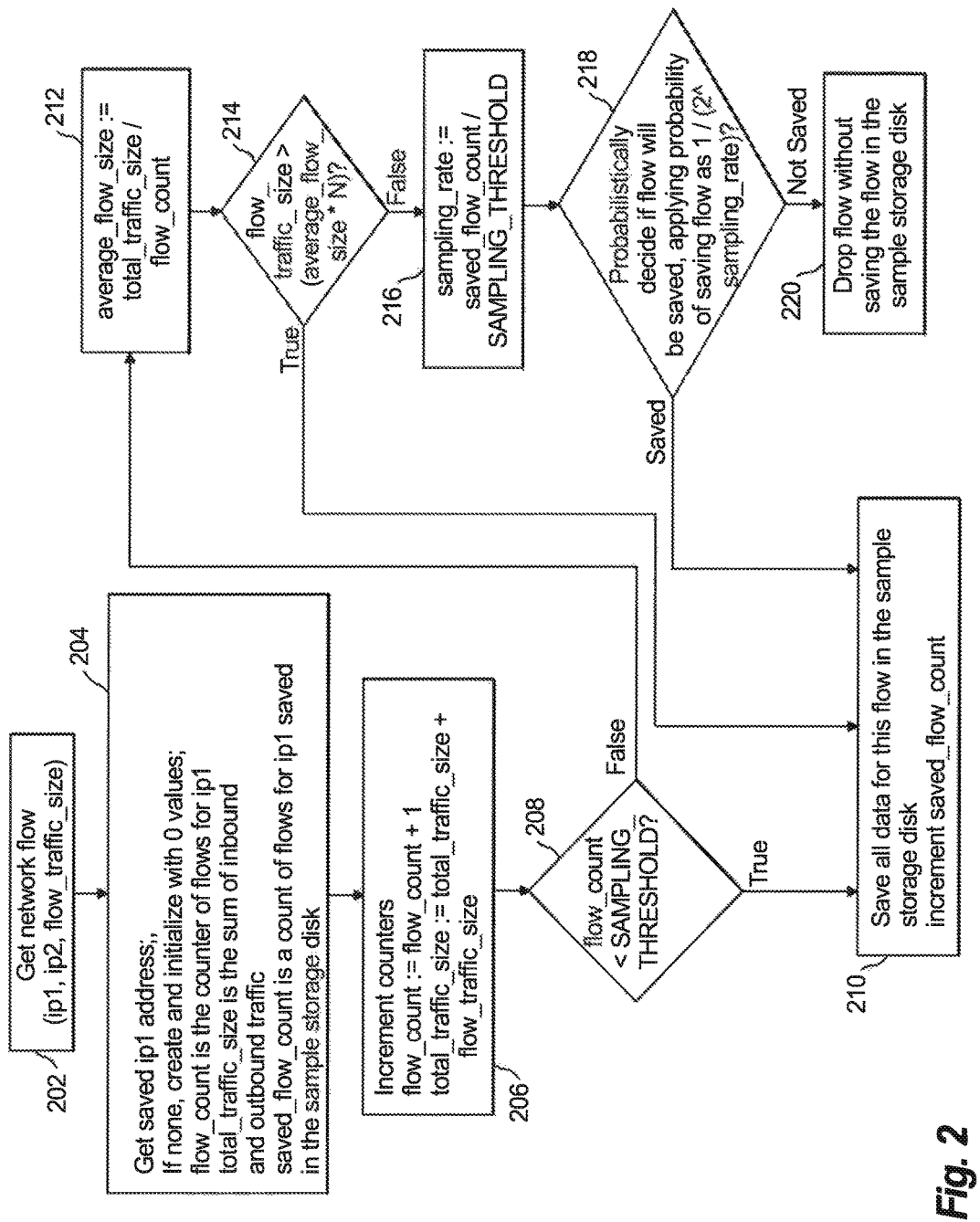
FIG. 2 illustrates a flowchart of an example method for sampling a large data set for source and/or destination addresses and for storing sampled data in large bins for long term storage in accordance with an illustrative embodiment of the present disclosure.
Figure 3:
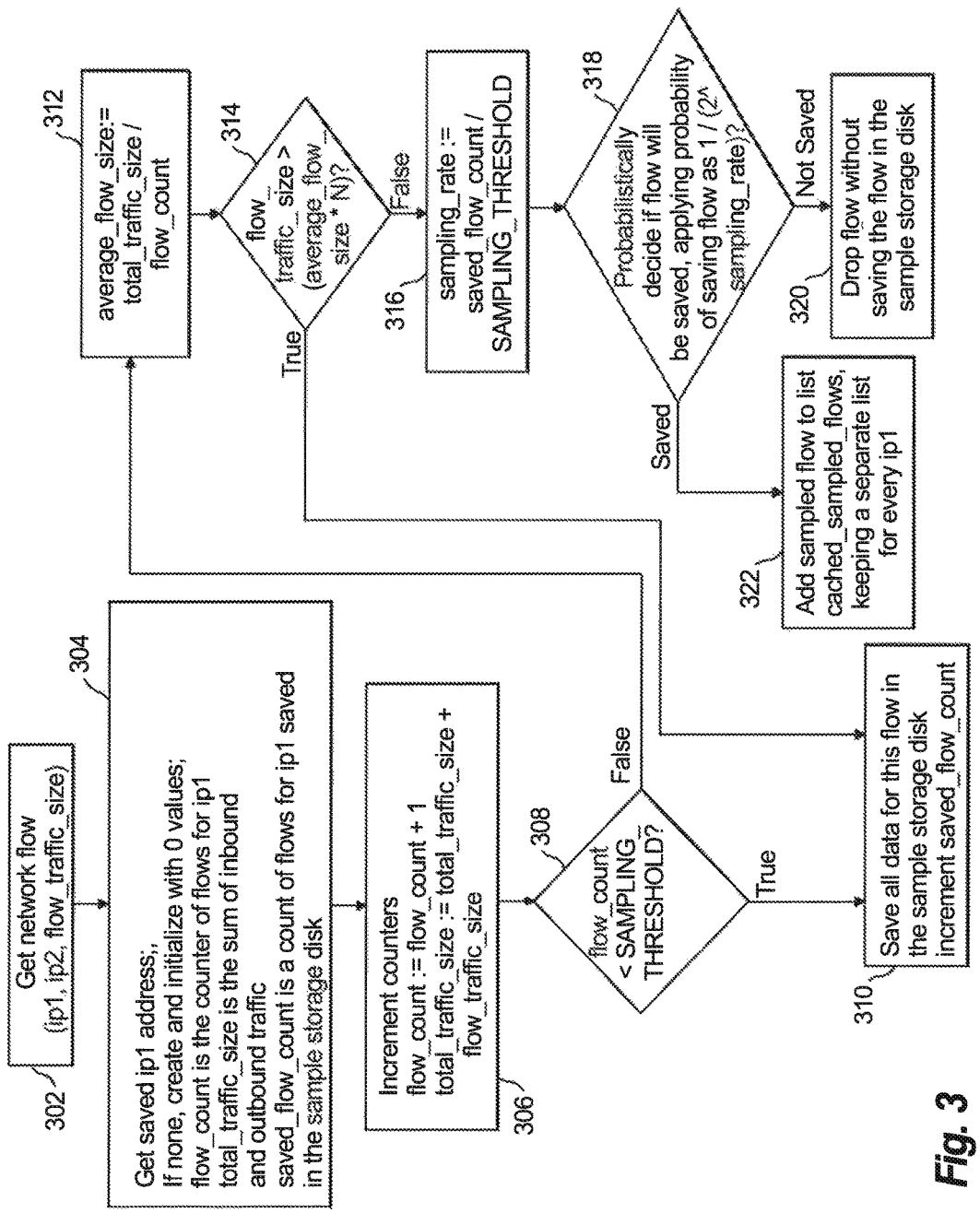
FIG. 3 illustrates a flowchart of an example method for sampling a large data set for source and/or destination addresses and for storing sampled data in small bins, in accordance with an illustrative embodiment of the present disclosure.
Figure 4:
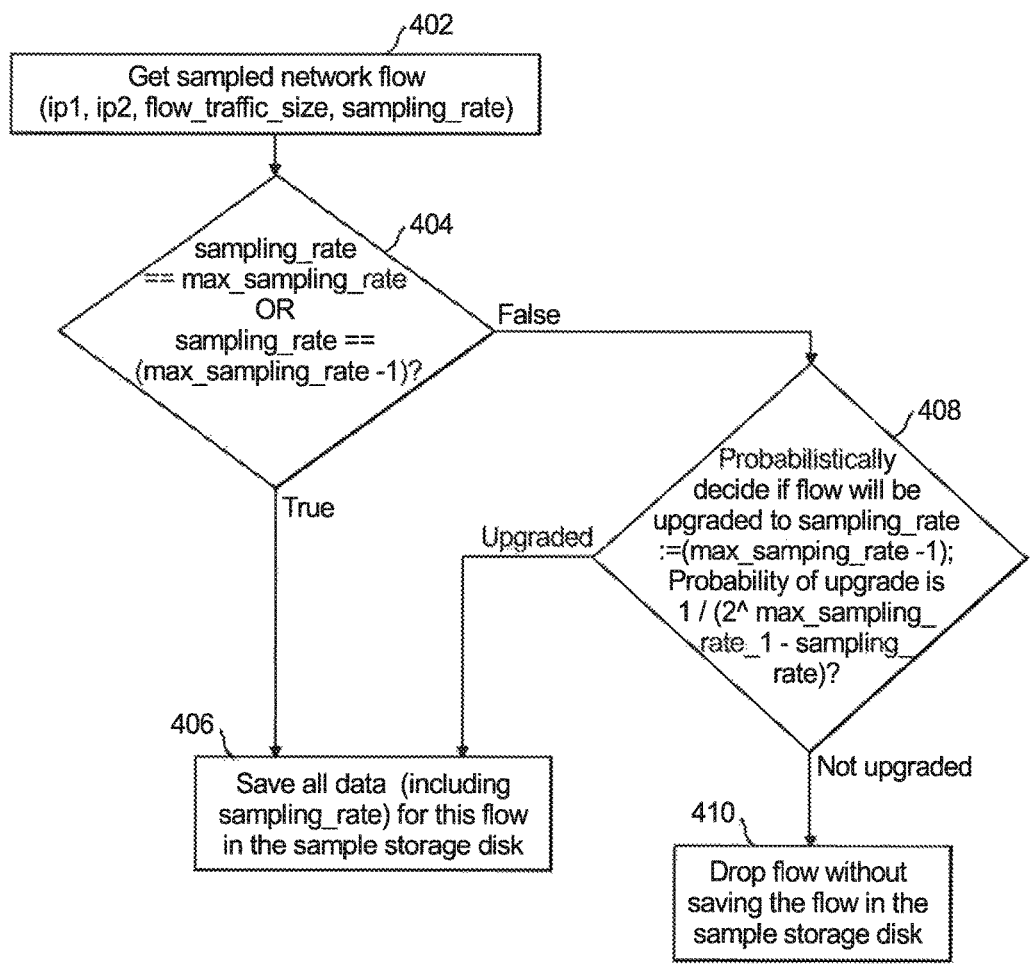
FIG. 4 illustrate a flowchart of an example method for selecting which sampled data included in temporarily stored cache contents are moved for storage in the small bins.
Figure 5:
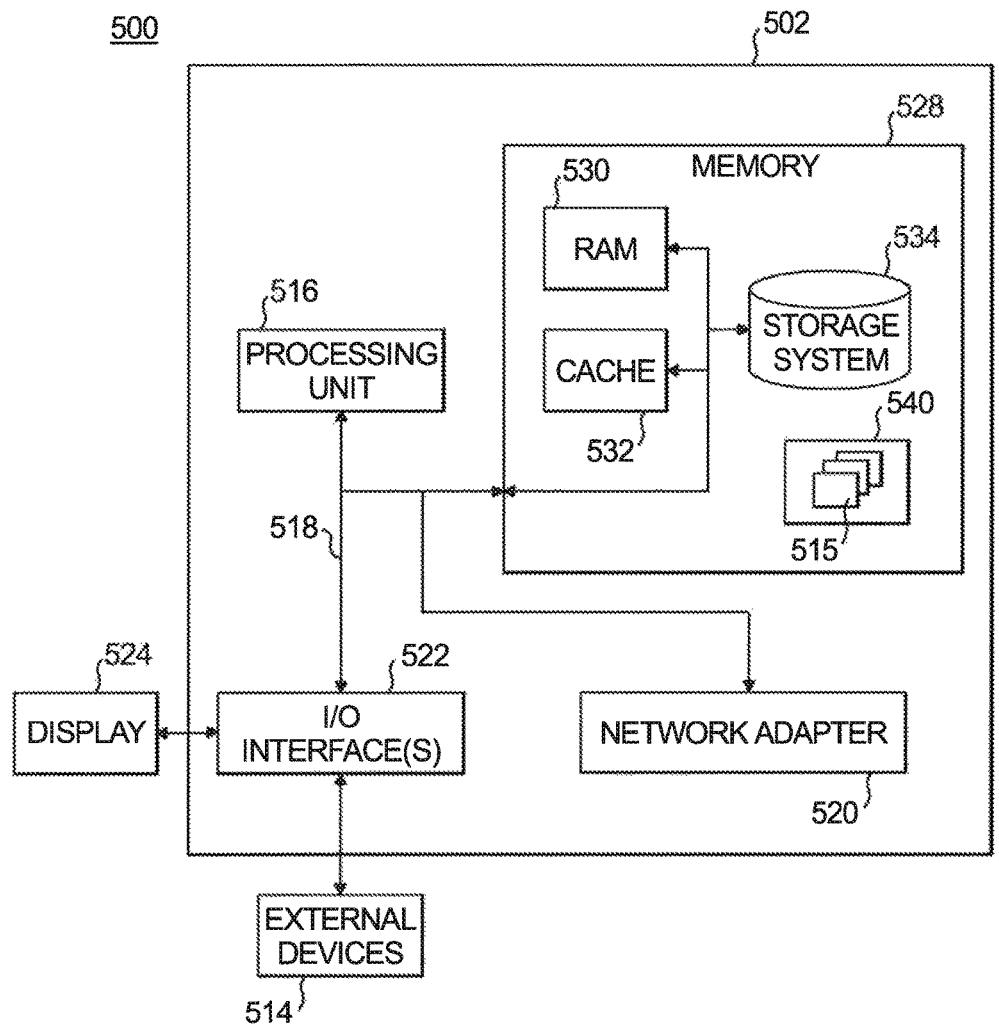
FIG. 5 illustrates a schematic block diagram of an example sample and analysis device of the network system shown in FIG. 1, in accordance with an illustrative embodiment of the present disclosure.

With reference now to FIGS. 2-4, shown are flowcharts demonstrating implementation of the various exemplary embodiments. It is noted that the order of operations shown in FIGS. 2-4 is not required, so in principle, the various operations may be performed out of the illustrated order or in parallel. Also certain operations may be skipped, different operations may be added or substituted, or selected operations or groups of operations may be performed in a separate application following the embodiments described herein.

In the example method shown, a large data set that includes a sequence of traffic records is accessed for discovering specified traffic records, and for conditionally sampling the discovered traffic records. The traffic records in the large data set, which are associated with network traffic flows of a network, such as network 102 shown in FIG. 1, are stored in a network monitor repository, such as network monitor repository 108 shown in FIG. 1. The sequence of the traffic records is based on the time stamp associated with each traffic record.

The method can be performed in response to a query. The query can specify one or more addresses and/or a portion of the network monitor repository in which to discover the specified address(es). The portion of the network monitor repository can be indicated by a specified time interval. Discovery of a traffic record can be based on whether the traffic record's time stamp is included in the query's time interval.

If only one address is specified, address pairs can be discovered in the network monitor repository that include the address specified by the query as a source and/or destination. For each address pair to be processed, such as an address pair (ip1, ip2) specified in the query, the method can be performed twice, first with ip1 assigned to be the source and ip2 assigned to be destination in the traffic record, and second with ip2 assigned to be the source and ip1 assigned to be the destination in the traffic record.

In the example method shown, sampled data is stored in large bins and small bins of a sample storage disk, such as bins 114 of sample storage disk 112. The large bins correspond to a long time interval and the small bins to a short time interval. In the example described, the long interval is one day and the short interval is five minutes, however other time intervals can be used. In an example in which the requested time interval is two days, the sampled data is stored in two one-day bins and 576 five-minute bins.

In the example method shown, the algorithm used for storing in small bins can be modified relative to the algorithm used for storing in large bins to use short-term caching. Caching can optionally be used for either algorithm. FIG. 2 shows an example method for storing sampled data in large bins, and FIG. 3 shows an example method for storing sampled data in small bins.

With reference to FIG. 2, an example method is shown and described, for sampling the large data set for source and/or destination addresses (ip1, ip2) and for storing sampled data in large bins, such as bins one day bins 114 as shown in FIG. 1, for long term storage. As previously mentioned, the method is repeated for source, destination (ip2, ip1).

At operation 202, the large data set is accessed and a traffic record associated with a traffic flow between devices having addresses ip1 and ip2 (with ip1 as the source) is discovered and received based on parameters specified in the query. The term "receive" herein refers to get, read, be given, copy, retrieve, or otherwise obtain data. The large data set can be accessed, e.g., iteratively, to discover each traffic record in the large data set that satisfies the parameters specified by the query. The source and destination addresses (e.g., IP addresses, without limitation) (ip1, ip2) of the traffic record are determined, if not already known. Additionally a size of the traffic flow associated with the received traffic record, flow_traffic_size, is determined.

At operation 204, counters associated with the source address, ip1, are received. If these counters have not yet been created, then the counters are created and initialized to zero. The counters include:

flow_count, which is a counter that represents the number of received traffic records associated with an address ip1, including previously received traffic records associated with ip1;

total_traffic_size, which is a sum of traffic sizes associated with all previously received traffic records, including traffic records associated with inbound and outbound traffic flows; and saved_flow_count, which is a count of received traffic records associated with ip1 that have been saved so far as sampled data.

At operation 206, the flow_count counter is incremented by one, and the total_traffic_size counter is incremented by the flow_traffic_size.

In embodiments, and with reference to operations 208, 210, 218, and 220, sampling is performed, based on application of a probability function, only if it is determined that a total flow counter associated with the received traffic record is more than a predetermined sampling threshold SAMPLING_THRESHOLD, otherwise the received traffic record is stored in the appropriate bin(s) as sampled data without performing sampling.

At operation 208, a determination is made whether flow_count<SAMPLING_THRESHOLD. If the determination at operation 208 is TRUE, then at operation 210 the received traffic record is stored in the sample storage disk and saved_flow_count is incremented. In particular, the sampled data is stored in the large bin that has an associated time interval that includes the time stamp associated with the traffic record. When storing the sampled data, if the probability function was applied, the sampled data includes an indication of the probability function that was applied, such as by saving any variables used in the probability function. Data associated with the received traffic record can also be saved with the sampled data, such as source and/or destination addresses, source and/or destination port, and/or protocol used, direct_order_flag, timestamp, incoming and/or outgoing traffic size, and/or payload data.

The sampled data is stored in a selected bin in the sample storage disk that has a time interval that includes the time stamp associated with the received traffic record. Since the traffic records are received sequentially based on their associated time stamps, sampled traffic records associated with the received traffic records can be stored in a sequence of bins, wherein the bins are sequenced based on their associated time intervals.

If the determination at operation 208 is FALSE, then, in embodiments, the method continues at operation 218 in which the probability function is applied to determine whether or not to sample the received traffic record by applying the probability function. The probability function is an exponentially decreasing probability function. In an example, the exponentially decreasing probability function decreases based on a sampling rate, sampling_rate, wherein:

sampling_rate:=saved_flow_counter/SAMPLING_THRESHOLD.

The probability of sampling is set to decrease exponentially in accordance with the sampling rate (sampling_rate). For example, based on the probability function, the probability of sampling the traffic record and saving the traffic record in the sample storage disk is $1/(2^{\text{sampling\_rate}})$. This example uses an exponent with base 2, however the disclosure is not limited to a particular base. For example, sampling_rate can be a decimal number used as an exponent with a different base, without a particular limitation to the base used.

If, based on the application of the probability function as applied at operation 218, the traffic record is determined to be saved, then to the method continues at operation 210, and the received traffic record is stored as sampled data in the large bin that has an associated time interval that includes the time stamp associated with the sampled data and saved_flow_count is incremented. An indication of the probability function, such as any variables used in the probability function (e.g., sampling_rate, where it is known that the function is $1/2^{\text{sampling\_rate}}$), can be stored in the large bin in association with the cached sampled data. Otherwise, if, based on the application of the probability function as applied at operation 218, the received traffic record is determined to not be saved, then the method continues at operation 220, in which the received traffic record is not saved in the sample storage disk.

In embodiments, with reference to optional operations 212, 214, a decision can be made to apply the probability of sampling only if flow_traffic_size is less than or equal to a scaled average flow size, wherein the scaled average flow size is based on total_traffic_size, flow_count, and a scaling factor (N). For example, the scaled average flow size can be equal to:

(total_traffic_size/flow_count)*N.

Otherwise, if flow_traffic_size is greater than the scaled average flow size, then the received traffic record is saved as sampled data to the sample storage disk and saved flow count is incremented.

In these embodiments, if the determination at operation 208 is FALSE, then the method continues at operation 212 (instead of to operation 218). At operation 212, an average flow size (average_flow_size) is determined, wherein average_flow_size:=total_traffic_size/flow_count.

Next, at operation 214, a determination is made whether flow_traffic_size is greater than a scaled average flow size, namely, whether:

flow_traffic_size>(average_flow_size*$N$).

If the determination at operation 214 is TRUE, then operation 210 is performed, and the received traffic record is stored in the sample storage disk and saved_flow_count is incremented. Otherwise, if the determination at operation 214 is FALSE, then the method continues at operation 216.

The method shown in FIG. 2 can be configurable, such as for tuning accuracy or the amount of data being stored as sampled data 116. For example, the variables, functions, and threshold values applied can be adjusted, such as SAMPLE_THRESHOLD, max_sampling_rate, the probability function applied, and N, each of which are described below. With reference to FIG. 3, an example method of sampling the large data set for source, destination (ip1, ip2) and for storing sampled data in small bins, such as bins five minute bins 114 as shown in FIG. 1, is shown and described.

Operations 302, 304, 306, 308, 310, 312, 314, 316, and 320 are equivalent, respectively, to operations 202, 204, 206, 208, 210, 212, 214, 216, and 220 of FIG. 2, and therefore, the description of operations 202, 204, 206, 208, 210, 212, 214, 216, and 220 of FIG. 2 apply to the respective operations 302, 304, 306, 308, 310, 312, 314, 316, and 320. There is a difference in operation 310 relative to operation 210, however. In operation 310, the sampled data and associated is stored in the small bin that has an associated time interval that includes the time stamp associated with the traffic record. When storing the sampled data, if the probability function was applied, the sampled data includes an indication of the probability function that was applied, which can include the function used and any variables used in the function. Since the same probability function is applied at this operation, it may not be necessary to store the function applied with each sampled data entry. With reference to operation 318, as in operation 218, the exponentially decreasing probability function is applied to determine whether or not to sample the received traffic record by applying the probability function, wherein the exponentially decreasing probability function decreases based on sampling_rate. Similar to operation 220 of FIG. 2, if, based on the application of the probability function as applied at operation 318, the traffic record is determined to not be saved, then the method continues at operation 320, in which the traffic record is not saved in the sample storage disk.

If, based on the application of the probability function as applied at operation 318, the traffic record is determined to be saved, then the method continues at operation 322. At operation 322, before storing the sampled data in a small bin of the sample storage disk, the sampled data and the associated sampling rate, which was determined at operation 316 and was used to sample the sampled data at operation 318, are cached, e.g., temporarily stored in temporary storage, such as cache 122 shown in FIG. 1.

The cache stores multiple lists, each list corresponding to a different address. As multiple iterations of the method are performed, sampled data designated to be stored in the cache are stored as an entry in the list that has an address that corresponds (e.g., matches) the address associated with the sampled data. The sampled data is stored in the entry together with the sampling rate calculated for that sampled data. A new list is formed when the address associated with sampled data designated to be stored in the cache does not match any of the addresses that correspond to the existing lists.

The cache is emptied at the end of a time interval associated with the cache. The time interval associated with the cache can have the same duration as the small bins' time interval. Additionally, the cache time interval can be the same (e.g., has the same start and end time) as a current small bin. The small bins are sequenced based on their associated time intervals, with the current small bin being the small bin that has an associated time interval that includes time stamps associated with the traffic record currently being received. When a traffic record is received that has a time stamp that is included in the time interval of the next small bin in the sequence, the current small bin changes and the next small bin becomes the current small bin.

The contents of the cache are removed periodically or intermittently. In embodiments, the contents of the cache are removed each time the current small bin is changed. In addition, the time interval associated with the cache is reset to the time interval associated with the new current small bin. Removal of the contents of the cache can include storing selected sampled data included in the cache contents and dropping the remainder of the contents. The lists can be removed as well.

With reference to FIG. 4, an example method is shown and described of selecting which sampled data included in the cache contents are stored in the small bins, such as small bins of bins 114 shown in FIG. 1, while allowing the remainder of the sampled data to be dropped.

At operation 402, an entry included in one of the lists in the cache, such as cache 122 shown in FIG. 1 is received. The entry includes sampled data and the sampling rate that was calculated for the sampled data (sampling_rate). The sampled data indicates the addresses associated with the corresponding traffic flow, the traffic size of the corresponding traffic flow, and the associated time stamp.

At operation 404, a list that the entry is included in is determined based on one of the addresses associated with the entry. In the example described, the addressed used to determine the entry is the source address. A maximum sampling rate (max_sampling_rate) is determined, wherein the maximum sampling rate is the largest of all of sampling rates associated with entries of the determined list.

Furthermore, at operation 404, a determination is made whether the sampling rate associated with the received traffic record satisfies a criterion related to the determined maximum sampling rate. In the example shown, the criterion is either:

(sampling_rate==max_sampling_rate) OR (sampling_rate==max_sampling_rate−1).

The method continues at operation 406 if it is determined that the criterion related to the determined maximum sampling rate is satisfied. At operation 406, the sampled data in the entry is stored in a small bin of the plurality of bins (such as bins 114 shown in FIG. 1) that has an associated time interval that includes the time stamp associated with the sampled data.

The method continues at operation 408 if it is determined that the criterion related to the determined maximum sampling rate is not satisfied. At operation 408 a determination is made whether or not to sample the cached sampled data by applying a second probability function that exponentially decreases in accordance with a difference between the determined maximum sampling rate and the calculated sampling rate.

If the determination at operation 408 was to sample the cached sampled data, then the method continues at operation 406 in which the cached sampled data is stored in the small bin. An indication of the second probability function can be stored in the small bin in association with the cached sampled data, which can include the function used and any variables used in the function. Since the same probability function is applied at this operation, it may not be necessary to store the function applied with each sampled data entry. If the determination at operation 408 was not to sample the cached sampled data, then the method continues at operation 410. At operation 410 the cached sampled data is allowed to be dropped without saving it to a disk, such as the sample storage disk 112 shown in FIG. 1.

In embodiments, when stored sampled data that is associated with at least one address having an associated sample flow counter (saved_flow_count) that is less than a predetermined minimum storage threshold is removed from the being stored in a disk, such as the sample storage disk 112 shown in FIG. 1.

In embodiments, a determination can be made whether there is an indication of a history of a low sampling probability when applying the probability function in association with the sampled data that is associated with a particular address. For example, a low probability list is maintained of each address associated with sampled data that was sampled in which the probability of sampling the particular address was less than a probability threshold. Each entry on the low probability list can be indicated as having an indication of a history of the low sampling probability, or alternatively, the indication of a history of the low sampling probability is only applied when the address was entered on the low probability list a predetermined number of times. In an example, the probability threshold is 1.0.

If a determination is made that there is a history of the low sampling probability, then operation 322 is performed, in which the entry is stored temporarily in the cache.

In embodiments, a total amount of flow counters acquired during the previous iterations is compared to a predetermined counter threshold. A determination is made whether the total amount of flow counters reaches a predetermined counter threshold. If the predetermined counter threshold is reached, then the flow counter is discarded if the flow counter fulfills a predetermined criterion that indicates the flow counter is rarely used. For example, the predetermined criterion that the flow counter is rarely used can be the flow counter having a value below a predetermined threshold value. In an example, the predetermined threshold value is two.

Since the sampled data 116 was obtained by sampling the large data set using probabilistic algorithms, statistical information for an aggregation of all of the selected bins 114 would not be accurately determined by simply adding associated flow count and flow traffic size values for entries in the selected bins 114 having the same ID information 204 (e.g., IP address). Rather, the analytic module offsets a probability function applied for sampling data and that was stored in association with the sampled data 116. For example, estimation of an actual traffic size of sampled data can include, for sampled data that was sampled using a probability factor 1/x, as determined by a probability function, multiplying the traffic size (incoming and/or outgoing, depending on the quantity being sought, by a factor x.

For example, when responding to a query, sample flow counters associated with each of the bins that were selected are aggregated by offsetting mathematically a probability function that was applied when updating the sample flow counters.

In embodiments, a query can be received, e.g., by the query manager 126 shown in FIG. 1, to perform a statistical analysis on stored sampled data. The query can specify at least one address of interest and a time interval. In response, bins are selected that have associated time intervals that satisfy the requested time interval. The query can be processed, e.g., by the sampling module 120 of the sample and analysis device 110, and the statistical analysis can be performed by the analytic module 128 shown in FIG. 1.

In an example, if the time interval requested is from 10:00 AM-12:00 PM on Apr. 1, 2016, twenty four small bins are selected that have time intervals that include the requested time interval. Sample flow counters (saved_flow_count) associated with each of the selected bins and the at least one address are aggregated by mathematically offsetting at least one of the probability functions applied (the probability function or the second probability function).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the sample and analysis device 110 shown in FIG. 1 may be implemented or executed by one or more computer systems. For example, the sample and analysis device 110 can be implemented using a computer system such as example computer system 502 illustrated in FIG. 5. In various embodiments, computer system 502 may be a server, a mainframe computer system, a workstation, a network computer, a desktop computer, a laptop, or the like, and/or include one or more of a field-programmable gate array (FPGA), application specific integrated circuit (ASIC), microcontroller, microprocessor, or the like.

Computer system 502 is only one example of a suitable system and is not intended to suggest any limitation as to the scope of use or functionality of embodiments of the disclosure described herein. Regardless, computer system 502 is capable of being implemented and/or performing any of the functionality set forth hereinabove.

Computer system 502 may be described in the general context of computer system-executable instructions, such as program modules, being executed by a computer system. Generally, program modules may include routines, programs, objects, components, logic, data structures, and so on that perform particular tasks or implement particular abstract data types. Computer system 502 may be practiced in distributed data processing environments where tasks are performed by remote processing devices that are linked through a communications network. In a distributed data processing environment, program modules may be located in both local and remote computer system storage media including memory storage devices.

Computer system 502 is shown in FIG. 4 in the form of a general-purpose computing device. The components of computer system 502 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 502 typically includes a variety of computer system readable media. Such media may be any available media that is accessible by network monitor device 108 and/or top-k monitor device 112, and it includes both volatile and non-volatile media, removable and non-removable media.

System memory 528 can include computer system readable media in the form of volatile memory, such as random access memory (RAM) 530 and/or cache memory 532. Computer system 502 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the disclosure.

Program/utility 540, having a set (at least one) of program modules 505, such as computer system 502, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 505 generally carry out the functions and/or methodologies of embodiments of the disclosure as described herein.

Computer system 502 may also communicate with one or more external devices 504 such as a keyboard, a pointing device, a display 524, etc.; one or more devices that enable a user to interact with computer system 502; and/or any devices (e.g., network card, modem, etc.) that enable network monitor device 108 and/or top-k monitor device 112 to communicate with one or more other computing devices. Such communication can occur via Input/Output (I/O) interfaces 522. Still yet, computer system 502 can communicate with one or more networks such as a local area network (LAN), a general wide area network (WAN), and/or a public network (e.g., the Internet) via network adapter 520. As depicted, network adapter 520 communicates with the other components of n 100 via bus 508. It should be understood that although not shown, other hardware and/or software components could be used in conjunction with computer system 502. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Potential advantages provided by the top-k monitor device 112 include the ability to manage queries for a variety of property intervals, e.g., time intervals, associated with event data discovered in a large, streamed data set. A user submitting queries to the top-k monitor device can obtain top-k data for a requested time interval in real time, including regularly updated top-k data for updated time intervals that can include the most recently streamed network data. Performance of the top-k processing can be tuned, such as to improve accuracy or storage efficiency. For example, tuning can include decreasing SAMPLING_THRESHOLD to reduce space consumed in the sample storage disk and increase the speed of processing queries, since using less disk space due to increased storage efficiency increases the speed of processing a query.

On the other hand, tuning can include increasing SAMPLING_THRESHOLD to improve accuracy. For example, since accuracy grows as a square root of SAMPLING_THRESHOLD, accuracy can be increased twofold by doubling SAMPLING_THRESHOLD.

The techniques described herein are exemplary, and should not be construed as implying any particular limitation of the certain illustrated embodiments. It should be understood that various alternatives, combinations, and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

The terms "comprises" or "comprising" are to be interpreted as specifying the presence of the stated features, integers, operations or components, but not precluding the presence of one or more other features, integers, operations or components or groups thereof.

Although the systems and methods of the subject disclosure have been described with respect to the embodiments disclosed above, those skilled in the art will readily appreciate that changes and modifications may be made thereto without departing from the spirit and scope of the certain illustrated embodiments as defined by the appended claims.

The invention claimed is:

1. A computer-implemented method to sample a large data set of traffic records, the traffic records corresponding to network traffic flows associated with at least one particular address, the method comprising:
    processing multiple iterations associated with respective traffic records of the large data set that satisfy particular criteria, processing an iteration of the multiple iterations comprising:
        receiving a traffic record from a source of a large data set of traffic records, the traffic record corresponding to a traffic flow and identifying a pair of addresses exchanging communications included in the traffic flow and including a traffic size value that indicates the size of communications included in the traffic flow;
        receiving a flow counter and a total traffic size, the flow counter representing the number of traffic flows received for one of the addresses of the pair identified, the number of traffic flows representing previously received traffic records associated with the address, the total traffic size representing a sum of traffic sizes associated with all previously received traffic records, the previously received traffic records having been received during previous iterations of the multiple iterations;
        incrementing the flow counter;
        adding the traffic size associated with the received traffic record to the total traffic size;
        if the flow counter is less than a predetermined sampling threshold, then storing a traffic record sample associated with the traffic record;
        if the flow counter is more than the predetermined sampling threshold, then determining whether or not to sample the received traffic record by applying an exponentially decreasing probability function; and
        storing the traffic record sample as sampled data associated with the traffic record only if the determination is to sample the received traffic record.

2. The method of claim 1, wherein storing the traffic record sample includes:
    incrementing a sample flow counter associated with the address, the sample flow counter representing a total number of traffic records saved to a sample storage disk for the address; and
    saving data associated with the received traffic record to the sample storage disk.

3. The method of claim 2, wherein the exponentially decreasing probability of sampling the received traffic records is determined by:
calculating a sampling rate to be equal to the sampled flow counter divided by the predetermined sampling threshold; and
setting the probability of sampling the received data traffic record to decrease exponentially in accordance with the sampling rate.

4. The method of claim 1, further comprising:
comparing the traffic size associated with the received traffic record to a scaled average flow size, the scaled average flow size based on the total traffic size, the total flow count, and a scaling factor;
if the traffic size is larger than the scaled average flow size, then storing the received traffic record; and
if the traffic size is less than the scaled average flow size, then determining whether or not to sample the received traffic record by applying the exponentially decreasing probability of sampling received traffic records.

5. The method of claim 3, wherein the large data set is streamed over time, each traffic record being associated with a time stamp, the sample storage disk including a data structure, wherein,
the data structure includes a plurality of bins, each bin being associated with a unique time interval defined by an associated start time relative to a reference time and a time duration, each bin being configured to store one or more sample traffic records that have an associated time stamp that is included in the bin's time interval, and
the plurality of bins includes a subset of small bins having associated relatively short time intervals and a subset of large bins having associated relatively long time intervals; the method further comprising:
storing the sampled data that corresponds to the received traffic record in the large bin and the small bin of the plurality of bins that has an associated time interval that includes the time stamp of the received traffic record.

6. The method of claim 5,
the method further comprising before storing the sampled data in the small bin, temporarily storing the sampled data as a cached sampled data and the calculated sampling rate as a cached sampling rate in a cache, wherein the cache includes multiple lists, each list of the multiple lists being associated with a different address and having at least one entry associated with at least one previous iteration, each entry storing sampled data and a corresponding calculated sampling, each entry being stored in a list of the multiple lists that is associated with a same address as an address associated with its sampled data, the cached sampled data and the cached sampling rate being stored in a list of the multiple lists that is associated with the same address as the address associated with the sampled data.

7. The method of claim 6, further comprising:
determining a maximum sampling rate that is the maximum sampling rate of all of sampling rates associated entries of the list;
determining whether the sampling rate associated with the received traffic record satisfies a criterion related to the determined maximum sampling rate;
if it is determined that the criterion related to the determined maximum sampling rate is satisfied, then storing the cached sampled data in a small bin of the plurality of bins that has an associated time interval that includes the time stamp associated with the sampled data;
if it is determined that the criterion is not satisfied, then determining whether or not to sample the cached sampled data by applying a second probability function that exponentially decreases in accordance with a difference between the determined maximum sampling rate and the calculated sampling rate; and
storing the cached sampled data to the small bin only if the determination is to sample the corresponding cached sampled data.

8. The method of claim 7, further comprising storing to the small bin, in association with storing the cached sampled data, at least one of the cached sampling rate and the second probability function applied.

9. The method of claim 3, further comprising, removing from the sample storage disk sampled data that was stored during previous iterations that is associated with at least one address having an associated sample flow counter that is less than a predetermined minimum storage threshold.

10. The method of claim 2, further comprising:
during the previous iterations, storing in association with sampled data a probability determined using the probability function of sampling the sampled data;
storing a low probability list of each address associated with sampled data in which the associated probability determined is less than a probability threshold; and
during the current iteration, temporarily storing the sampled data in the cache if the address is included in the low probability list.

11. The method of claim 1, further comprising, if the received traffic record does not have a corresponding flow count, initializing the flow count to zero.

12. The method claim 11, further comprising:
comparing a total amount of flow counters acquired during the previous iterations to a predetermined counter threshold; and
if the total amount of flow counters is less than the predetermined counter threshold, discarding the flow counter if the flow counter fulfills a predetermined criterion that indicates the flow counter is rarely used.

13. The method of claim 5, further comprising:
when storing the traffic record sample associated with the traffic record, storing an indication of the probability function that was applied in association with the traffic record sample;
receiving a query for stored sampled data associated with at least one address and a requested time interval;
selecting bins of the plurality of bins that have associated time intervals that satisfy the requested time interval; and
aggregating sample flow counters associated with each of the selected bins and the at least one address by mathematically offsetting for the probability function applied in association with each of the sample flow counters being aggregated.

14. The method of claim 7, further comprising:
when storing the traffic record sample associated with the traffic record, storing an indication of the probability function and the second probability function that was applied in association with the traffic record sample;
receiving a query for stored sampled data associated with at least one address and a requested time interval;
selecting bins of the plurality of bins that have associated time intervals that satisfy the requested time interval; and aggregating sample flow counters associated with each of the selected bins and the at least one address by mathematically offsetting at least one of the probability function and the second probability function applied in association with each of the sample flow counters being aggregated.

15. A system to sample a large data set of traffic records, the traffic records corresponding to network traffic flows associated with at least one particular address, the system comprising:
a memory configured to store instructions;
a processor disposed in communication with the memory, wherein the processor upon execution of the instructions is configured to:
process, in multiple iterations associated with respective traffic records of the large data set that satisfy particular criteria, processing an iteration of the multiple iterations comprising:
receiving a traffic record from a source of a large data set of traffic records, the traffic record corresponding to a traffic flow and identifying a pair of addresses exchanging communications included in the traffic flow and including a traffic size value that indicates the size of communications included in the traffic flow;
receiving a flow counter and a total traffic size, the flow counter representing the number of traffic flows received for one of the addresses of the pair identified, the number of traffic flows representing previously received traffic records associated with the address, the total traffic size representing a sum of traffic sizes associated with all previously received traffic records, the previously received traffic records having been received during previous iterations of the multiple iterations;
incrementing the flow counter;
adding the traffic size associated with the received traffic record to the total traffic size;
if the flow counter is less than a predetermined sampling threshold, then storing a traffic record sample associated with the traffic record;
if the flow counter is more than the predetermined sampling threshold, then determining whether or not to sample the received traffic record by applying an exponentially decreasing probability function; and
storing the traffic record sample as sampled data associated with the traffic record only if the determination is to sample the received traffic record.

16. The system of claim 15, wherein storing the traffic record sample includes:
incrementing a sample flow counter associated with the address, the sample flow counter representing a total number of traffic records saved to a sample storage disk for the address; and
saving data associated with the received traffic record to the sample storage disk.

17. The system of claim 16, wherein the exponentially decreasing probability of sampling the received traffic records is determined by:
calculating a sampling rate to be equal to the sampled flow counter divided by the predetermined sampling threshold; and
setting the probability of sampling the received data traffic record to decrease exponentially in accordance with the sampling rate.

18. The system of claim 17,
wherein the processor, upon execution of the instructions, is further configured to, before storing the sampled data, temporarily storing the sampled data as a cached sampled data and the calculated sampling rate as a cached sampling rate in a cache, wherein the cache includes multiple lists, each list of the multiple lists being associated with a different address and having at least one entry associated with at least one previous iteration, each entry storing sampled data and a corresponding calculated sampling, each entry being stored in a list of the multiple lists that is associated with a same address as an address associated with its sampled data, the cached sampled data and the cached sampling rate being stored in a list of the multiple lists that is associated with the same address as the address associated with the sampled data.

19. A non-transitory computer readable storage medium and one or more computer programs embedded therein, the computer programs comprising instructions, which when executed by a computer system, cause the computer system to:
process multiple iterations associated with respective traffic records of the large data set that satisfy particular criteria, processing an iteration of the multiple iterations comprising:
receiving a traffic record from a source of a large data set of traffic records, the traffic record corresponding to a traffic flow, the traffic record further identifying a pair of addresses of devices that exchange communications included in the traffic flow and including a traffic size value that indicates the size of communications included in the traffic flow;
receiving a flow counter and a total traffic size, the flow counter representing the number of traffic flows received for one of the addresses of the pair identified, the number of traffic flows representing previously received traffic records associated with the address, the total traffic size representing a sum of traffic sizes associated with all previously received traffic records, the previously received traffic records having been received during previous iterations of the multiple iterations;
incrementing the flow counter;
adding the traffic size associated with the received traffic record to the total traffic size;
if the flow counter is less than a predetermined sampling threshold, then storing a traffic record sample associated with the traffic record;
if the flow counter is more than the predetermined sampling threshold, then determining whether or not to sample the received traffic record by applying an exponentially decreasing probability function; and
storing the traffic record sample as sampled data associated with the traffic record only if the determination is to sample the received traffic record.

20. The computer readable storage medium of claim 19, wherein storing the traffic record sample includes:
incrementing a sample flow counter associated with the address, the sample flow counter representing a total number of traffic records saved to a sample storage disk for the address; and
saving data associated with the received traffic record to the sample storage disk.

* * * * *